United States Patent [19]

Sehm

[11] 4,420,610
[45] Dec. 13, 1983

[54] SOLVENT EXCHANGE PROCESS FOR CARBOXYL CONTAINING POLYMER SLURRIES

[75] Inventor: Eugene J. Sehm, Akron, Ohio
[73] Assignee: The B. F. Goodrich Company, Akron, Ohio
[21] Appl. No.: 459,065
[22] Filed: Jan. 19, 1983
[51] Int. Cl.$^3$ .............................................. C08K 5/01
[52] U.S. Cl. ...................... 528/501; 524/848; 524/490; 524/491
[58] Field of Search ............... 524/848, 490, 491; 528/501

[56] References Cited

U.S. PATENT DOCUMENTS

| | | | |
|---|---|---|---|
| 2,798,053 | 7/1957 | Brown | 521/38 |
| 3,142,664 | 7/1964 | Bauer | 524/491 |
| 3,940,351 | 2/1976 | Schlatzer, Jr. | 524/795 |
| 4,087,393 | 5/1978 | Tsubuko et al. | 524/848 |

Primary Examiner—Paul R. Michl
Assistant Examiner—A. H. Walker
Attorney, Agent, or Firm—J. Hughes Powell, Jr.

[57] ABSTRACT

Slurries of cross linked carboxyl acid polymers in petroleum base liquids such as mineral spirits are readily obtained by a solvent exchange process wherein a slurry of cross-linked carboxylic acid polymer in the organic liquid it was polymerized in, said liquid having a boiling point below that of the mineral spirits, is heated to a temperature to distill off the polymerization organic liquid while replacing this organic material with the mineral spirits, which may be done simultaneously while essentially maintaining constant volume if desired.

16 Claims, No Drawings

SOLVENT EXCHANGE PROCESS FOR CARBOXYL CONTAINING POLYMER SLURRIES

BACKGROUND OF THE INVENTION

Water sensitive carboxyl containing polymers of vinylidene monomers containing at least one terminal $CH_2<$ group are well known. Such polymers may be homopolymers or copolymers with other vinylidene monomers, of unsaturated polymerizable carboxylic acids such as acrylic acid, methacrylic acid, maleic acid or the anhydride, itaconic acid and the like. The polymers of these acids are usually cross-linked with small amounts of cross-linking agents, present during polymerization, which, in the form of their salts, absorb large quantities of water or other liquids. These polymer materials are normally prepared by polymerization with free radical forming catalysts in organic media such as benzene or halogenated hydrocarbons which are solvents for monomers but are non-solvents for the resulting polymers. During the course of such polymerization, the polymer begins to precipitate from solution as it is formed and forms a slurry in the solvent which may cause processing problems at high total solids contents. Since benzene and many of the halogenated hydrocarbons are not preferred for use in some industrial applications, and since in many applications for the water swellable polymers, certain petroleum based solvents such as mineral spirits is the desired solvent used, slurries of the polymers in mineral spirits and the like are desired. However, polymerizations in mineral spirits have caused some processing problems and changes in some physical properties of the polymers and may require modification of normal polymerization processes. Other techniques for obtaining mineral spirit slurries of water sensitive carboxyl containing polymers are desired, particularly processes that could provide higher total solids slurries than readily obtainable by direct polymerization in large scale equipment.

SUMMARY OF THE INVENTION

Slurries of cross linked carboxyl acid polymers in petroleum base liquids such as mineral spirits are readily obtained by a solvent exchange process wherein a slurry of cross-linked carboxylic acid polymer in the organic liquid it was polymerized in, said liquid having a boiling point below that of the exchange petroleum base liquid, is heated to a temperature to distill off the polymerization organic liquid while replacing this organic material with the petroleum base liquid, which may be done simultaneously while essentially maintaining constant volume if desired.

DETAILED DESCRIPTION

The carboxyl containing polymers are prepared from vinylidene monomers containing at least one terminal $CH_2<$ group. Such polymers may be homopolymers or copolymers of an unsaturated, polymerizable carboxylic monomers such as acrylic acid, methacrylic acid, maleic acid, itaconic acid and the like, or copolymers thereof. Typical materials are those described in U.S. Pat. No. 2,798,053. Copolymers, for example, include copolymers of acrylic acid with small amounts of polyalkyenyl polyether cross-linkers that are gel-like polymers, which, especially in the form of their salts, absorb large quantities of water or solvents with subsequent substantial increase in volume. Other useful carboxyl containing polymers are described in U.S. Pat. No. 3,940,351, directed to polymers of unsaturated carboxylic acid and at least one alkyl acrylic or methacrylic ester where the alkyl group contains 10 to 30 carbon atoms. Other types of such copolymers are described in U.S. Pat. No. 4,062,817 wherein the polymers described in U.S. Pat. No. 3,940,351 contain additionally another alkyl acrylic or methacrylic ester and the alkyl groups contain 1 to 8 carbon atoms.

The carboxyl containing polymers have molecular weights greater than about 500 to as high as several million, usually greater than about 10,000 to 900,000 or more. Carboxylic polymers and copolymers such as those of acrylic acid, methacrylic acid, maleic acid, or the anhydrides thereof also may be cross-linked with polyfunctional materials as divinyl benzene, unsaturated diesters and the like, as is disclosed in U.S. Pat. Nos. 2,340,110; 2,340,111 and 2,533,635.

The carboxylic monomers useful in the production of polymers used in this invention are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, $-C=C-COOH$; or as a part of a terminal methylene grouping $CH_2=C<$. Olefinically-unsaturated acids of this class include such materials as the acrylic acids typified by the acrylic acid itself, methacrylic acid, ethacrylic acid, alpha-chloro-acrylic acid, alpha-cyano acrylic acid, beta methyl-acrylic acid (crotonic acid), alpha-phenyl acrylic acid, beta-acryloxy propionic acid, sorbic, acid, alpha-chloro sorbic acid, angelic acid, cinnamic acid, p-chloro cinnamic acid, beta-styryl acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

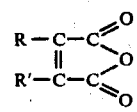

wherein R and R' are selected from the group consisting of hydrogen, halogen and cyanogen $(-C=N)$ groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers for use are the monoolefinic acrylic acids having the general structure

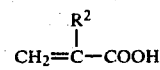

wherein $R^2$ is a substituent selected from the class consisting of hydrogen, halogen, and the cyanogen $(-C=N)$ groups, monovalent alkyl radicals, monovalent aryl radicals, monovalent aralkyl radicals, monovalent alkaryl radicals and monovalent cycloaliphatic radicals. Of this class, acrylic and methacrylic acid are most preferred. Another useful carboxylic monomer is maleic anhydride or the acid.

The polymers contemplated include both homopolymers of carboxylic acids or anhydrides thereof, or the defined carboxylic acids copolymerized with one or more other vinylidene monomers containing at least one terminal $CH_2<$ group. Such materials include, for example, acrylate ester monomers including those acrylic acid ester monomers such as derivatives of an acrylic acid represented by the formula

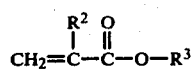

wherein $R^3$ is an alkyl group having from 1 to 30 carbon atoms, preferably 1 to 20 carbon atoms and $R^2$ is hydrogen, methyl or ethyl, present in the copolymer in amount, for example, from about 1 to 40 weight percent or more.

Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-hexyl methacrylate, and the like; higher alkyl acrylic esters are decyl acrylate, isodecyl methacrylate, lauryl acrylate, stearyl acrylate, behenyl acrylate and melissyl acrylate and the corresponding methacrylates. Mixtures of two or three or more long chain acrylic esters may be successfully polymerized with one of the carboxylic monomers. One useful class of copolymers are methacrylates where the alkyl group contains 16 to 21 carbon atoms. Typical polymers have been with 10 to 20 weight percent isodecyl methacrylate, 5 to 15 weight percent lauryl methacrylate, 2 to 10 weight percent stearyl methacrylate, with acrylic acid. Mixtures of these two classes of acrylates provide useful copolymers.

The polymers also may be cross-linked with any polyfunctional vinylidene monomer containing at least 2 terminal $CH_2<$ groups, including for example, butadiene, isoprene, divinyl benzene, divinyl naphthlene, allyl acrylates and the like. Particularly usedful cross-linking monomers for use in preparing the copolymers, if one is employed, are polyalkenyl polyethers having more than one alkenyl ether grouping per molecule. The most useful possess alkenyl groups in which an olefinic double bond is present attached to a terminal methylene grouping, $CH_2=C<$. They are made by the etherification of a polyhydric alcohol containing at least 4 carbon atoms and at least 2 hydroxyl groups. Compounds of this class may be produced by reacting an alkenyl halide, such as allyl chloride or allyl bromide with a strongly alkaline aqueous solution of one or more polyhydric alcohols. The product is a complex mixture of polyethers with varying numbers of ether groups. Analysis reveals the average number of ether groupings on each molecule. Efficiency of the polyether cross-linking agent increases with the number of potentially polymerizable groups on the molecule. It is preferred to utilize polyethers containing an average of two or more alkenyl ether groupings per molecule. Other cross-linking monomers includes for example, diallyl esters, dimethallyl ethers, allyl or methallyl acrylates and acrylamides, tetraallyl tin, tetravinyl silane, polyalkenyl methanes, diacrylates, and dimethacrylates, divinyl compounds such as divinyl benzene, polyallyl phosphate, diallyloxy compounds and phosphite esters and the like. Typical agents are allyl pentaerythritol, allyl sucrose, trimethylolpropane triacrylate, 1,6-hexanediol diacrylate, trimethylolpropane diallyl ether, pentaerythritol triacrylate, tetramethylene dimethacrylate, ethylene diacrylate, ethylene dimethacrylate, triethylene glycol dimethacrylate, and the like. Allyl pentaerythritol, trimethylolpropane diallylether and allyl sucrose provide excellent polymers.

When the optional cross-linking agent is present, the polymeric mixtures usually contain up to about 5% or more by weight of cross-linking monomer based on the total of carboxylic acid monomer, plus other monomers, if present and more preferably about 0.1 to 2.0 weight percent.

Other vinylidene monomers may also be used, particularly in conjunction with the acrylic acid esters, including the acrylic nitriles, $\alpha,\beta$-olefinically unsaturated nitriles useful are preferably the monoolefinically unsaturated nitriles having from 3 to 10 carbon atoms such as acrylonitrile, methacrylonitrile, ethacrylonitrile, chloroacrylonitrile, and the like. Most preferred are acrylonitrile and methacrylonitrile. The amounts used are, for example, for some polymers are from about 5 to 30 weight percent of the total monomers copolymerized. Acrylic amides include monoolefinically unsaturated amides also may be used. These have at least one hydrogen on the amide nitrogen and the olefinic unsaturation is alpha-beta to the carbonyl group. Representative amides include acrylamide, methacrylamide, N-methyl acrylamide, N-t-butyl acrylamide, N-cyclohexyl acrylamide, N-ethyl acrylamide and others. Very much preferred are acrylamide and methacrylamide used in amounts, for example, from about 1 to 30 weight percent of the total monomers copolymerized. Other acrylic amides include N-alkylol amides of alpha, beta-olefinically unsaturated carboxylic acids including those having from 4 to 10 carbon atoms such as N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid, N-methylol maleamic acid esters, the N-alkylol amides of the vinyl aromatic acids such as N-methylol-p-vinyl benzamide, and the like and others. The preferred monomers of the N-alkylol amide type are the N-alkylol amides of alpha, beta-monoolefinically unsaturated monocarboxylic acids and the most preferred are N-methylol acrylamide and N-methylol methacrylamide used in amounts for example of about 1 to 20 weight percent. N-alkoxymethyl acrylamides also may be used. It is thus intended that where references are made herein regarding the essential N-substituted alkoxymethyl amides, the term "acrylamide" includes "methacrylamide" within its meaning. The preferred alkoxymethyl acrylamides are those wherein the alkyl group containing from 2 to 5 carbon atoms, as N-butoxymethyl acrylamide.

There are many other useful comonomers that may be used in addition to those described above, in amounts of up to about 30 percent or more by weight of the total monomers. Suitable comonomers include $\alpha$-olefins containing from 2 to 12 carbon atoms, more preferably from 2 to 8 carbon atoms; dienes containing from 4 to 10 carbon atoms; vinyl esters and allyl esters such as vinyl acetate; vinyl aromatics such as styrene, methyl styrene, cholorstyrene; vinyl and allyl ethers and ketones such as vinyl methyl ether and methyl vinyl ketone; chloroacrylates, cyanoalkyl acrylates such as α-cyanomethyl acrylate, the α-,β- and γ-cyanopropyl acrylate; alkoxyacrylates such as methoxy ethyl acrylate; haloacrylates as chloroethyl acrylate; vinyl halides and vinyl chloride, vinylidene chloride and the like; vinyl benzyl chlorides; esters of maleic and fumaric acid and the like; divinyls, diacrylates and other polyfunctional monomers such as divinyl ether, diethylene glycol diacrylate, ethylene glycol dimethacrylate, methylene-bis-acrylamide, allylpentaerythritol, and the like; and bis(β-haloalkyl) alkenyl phosphonates such as bis(β-chloroethyl) vinyl phosphonate and the like as are known to those skilled in the art. Copolymers wherein the carboxy containing monomer is a minor constituent, and the other vinylidene monomers are present on major components are readily prepared in accordance with the process of this invention.

These copolymers may include as little as 8 weight percent of the total polymer of a carboxyl containing monomer, up to 100 percent, i.e. homopolymer. Particularly useful copolymers contain greater than 40 percent acid and preferably greater than 70 weight percent acid.

Polymerization of the monomers is usually carried out in the presence of a free radical catalyst in a closed vessel in an inert atmosphere under autogenous pressure or artificially-induced pressure, or in an open vessel in an inert atmosphere under reflux at atmospheric pressure. Temperature of the polymerization may be varied from about 0° to 125° C. or lower or higher. Polymerization at 25° to 90° C. using a free radical catalyst is generally effective in producing polymer yields of 75 percent to 100 percent. Typical free radical forming catalysts include peroxygen compounds such as sodium, potassium and ammonium persulfates, caprylyl peroxide, benzoyl peroxide, hydrogen peroxide, pelargonyl peroxide, cumene hydroperioxides, tertiary butyl diperphthalate, tertiary butyl perbenzoate, sodium peracetate, di(2-ethylhexyl)peroxydicarbonate, and the like, as well as azo catalysts such as azodiisobutyryl nitrile. Other catalysts utilizable are the so-called "redox" type of catalyst and the heavy-metal activated catalyst systems. Ultraviolet light may also be used as a source of free radicals. Some systems polymerize solely by heat, but catalysts provide better control. The monomer may be batch charged or continously added during the course of polymerization or by any other manner of polymerization techniques conventionally used.

The polymerizations are conducted in inert liquid media having some solubilizing effect on one or more of the monomeric ingredients, but substantially none on the resulting polymer. In other words, the medium used for the polymerization is one in which the monomers are preferably soluble and the polymer is substantially insoluble. Such materials are normally organic liquids which are solvents for the monomers, but nonsolvents for the polymers, or a mixture of such solvent so that the polymer product is preferably obtained as a very fine friable or fluffy precipitate. These solvents normally have solubility parameters of about 5 to about 10 (cal/cm³)½ and dielectric constants of about 1.7 to about 9.5. Typical solvents include hydrocarbon containing 6 to 8 carbon atoms, benzene, tetralin, hexane, heptane, cyclohexane, carbon tetrachloride, chloroform, trichloroethylene, methyl chloride, ethyl chloride and methylene chloride; chlorofluoroalkanes such as chlorofluoromethane and chlorofluoroethane containing at least 4 halogen atoms; esters such as methyl acetate and ethyl acetate; ketones such as methylethylketone, acetone, and dioxane; alcohols including methanol, ethanol, butanol, and the like. Such liquids must have boiling points below that of mineral spirits, and normally have boiling points below about 125° C., preferably less than 100° C., benzene and methylene chloride, for example. The amount of organic medium used normally will be in excess of the monomers to be polymerized and the proportion may vary from at least 1 weight percent of monomers and 99 weight percent organic medium up to about 50 weight percent monomers and 50 weight percent organic medium, more normally a concentration of about 5 to 20 weight percent organic monomers is employed.

Improved slurry properties or quality, and higher total solids are often obtained when the polymerizations are conducted in the presence of non-ionic surface active agents. Varying amounts may be used as some surfactants are more effective with one organic liquid system and others with another liquid.

In the practice of the invention, any of the general types of non-ionic surface active agents or surfactants may be used in the polymerization media. The surfactant is normally mixed with the monomer or monomers to be polymerized prior to being formed into discrete droplets. Typical non-ionic surfactants used are those falling within the following generic classes (1) polyoxyethylene alkylphenols; (2) polyoxyethylene alcohols; (3) polyoxyethylene esters of fatty acids; (4) polyoxyethylene alkylamines; (5) polyoxyethylene alkylamides; (6) polyol surfactants including polyglycerol esters; (7) polyalkylene oxide block copolymers; (8) polyethylene oxide alkyl ethers; and the like.

These compounds have a multiplicity of functional groups and accordingly, a very large number of modifications is possible. Mixtures of said compounds can also be used, for example, mixtures of sorbitan monooleate and sorbitan trioleate and glycerol monooleate and dioleate. Usually the amount of non-ionic surfactant employed will be in the range of about 0.05% to about 10.0% by weight, based on the weight of the monomer or monomers to be polymerized. Preferably, an amount of surfactant in the range of 0.1 to 5.0 by weight is employed. A group of compounds found to be useful include, for example, sorbitan monolaurate, sorbitan monostearate, glycerol monostearate and diostearate, phenyl phosphoric acid ester, polyoxyethylene sorbitan (4) monostearate, polyoxyethylene sorbitan (5) monostearate, sorbitan tristearate, and sorbitan esters of palmitric and stearic acid.

In the practice of the invention, the polymerization reactors may be either batch, semi-batch or continuous. The agitation may be any agitation sufficient to maintain the slurry and obtain effective heat transfer including, for example, helical agitators, pitched turbines and the like. A useful temperature range is from the range of 30° C. to 90° C. at about 1 atmosphere. Normally polymerization time is from about 5 to 12 hours. In any event, the polymer slurries produced are then subjected to the solvent interchange process in accordance with this invention.

The exchange organic liquids are preferably substantially inert, water clear, liquid petroleum fractions such as mineral spirits, mineral oil and the like. These are generally identified as petroleum base liquids, containing a major proportion of aliphatic hydrocarbons, and having a boiling range of from about 90° C. to about 350° C. The mineral spirits used in the practice of this invention are colorless, combustible, petroleum liquid products, normally containing a major proportion of liquid aliphatic hydrocarbon materials. The specific gravity normally ranges from about 0.76 to about 0.79, with a boiling range from about 140° C. to about 210° C., normally about 185° C. to 203° C. While the flash point is normally above about 40° C., for safety reasons the flash point may be above about 60° C. A material having a composition of 0 to less than 5 percent aromatics, about 40 to 80 percent paraffins and about 15 to about 60 percent naphtha, having a flash point about 60° C. produces good results.

In the practice of the invention, the solvent exchange is accomplished by adding mineral spirits, for example, to the carboxyl containing polymer slurry, a slurry in the polymerization media that has a boiling point below that of the mineral spirits, and distilling off the lower boiling polymerization media, thus leaving the polymer slurried in the more desirable mineral spirits. A higher slurry total solids content is obtained if desired when a lesser amount of mineral spirits is added than the amount of the polymerization media or liquid taken off. While all of the mineral spirits to be used may be added at the beginning of the distillation or stripping to remove the polymerization media, this may require equipment of larger sizes than is needed, and handling of large volumes of slurry. The mineral spirits may be added to the polymerization vessel as the polymerization solvent is distilled off if the reactor is so equipped; or the slurry may be transferred to distillation or stripping equipment and the solvent interchange accomplished there.

In one efficient embodiment of the invention, the polymerization solvent is removed and replaced with mineral spirits substantially simultaneously, or approximately so, by feeding in continuously, or in batch increments, an equivalent volume of mineral spirits substantially equivalent to the liquid being replaced, or if a higher total solids polymer slurry in mineral spirits is desired, with a lesser volume mineral spirits than liquid removed.

While the mineral spirits may be added before, or during the removal of the polymerization solvent, it is essential that the addition of mineral spirits begin no later than the point at which about 50 volume percent of the polymerization media has been removed, to maintain good heat transfer and for the most efficient operations to obtain a satisfactory slurry of the polymer in the mineral spirits. The minimum amount of mineral spirits added at this point should be enough so that the slurry is maintained, that is, that there is sufficient solvent to maintain solvent external to the particles. In other words, to keep the volume of polymerization media left in the slurry plus the mineral spirits being added, at no less than 50 percent of the initial liquid volume of the slurry.

The Examples describe typical and representative embodiments and practice of the invention.

EXAMPLE I

A cross-linked carboxyl containing polymer slurry was prepared in methylene chloride as follows:

A mixture of 515 weight parts of methylene chloride, (1.32 density) 27 weight parts of acrylic acid, 0.5 weight parts of trimethylolpropane diallyl ether and 1.1 weight parts of polyoxyethylene lauryl ether was charged to a stirred reactor, heated to reflux under nitrogen to about 40° C. Then 0.8 weight parts of di(2-ethylhexyl)peroxy dicarbonate peroxide was injected into the reactor and the mixture was maintained at 40° C. After about 20 minutes, a mixture of 128 weight parts of methylene chloride, 86 weight parts of acrylic acid, 1.8 weight parts of trimethylolpropane diallyl ether and 3.5 weight parts of polyoxyethylenelauryl ether was metered into the reactor over a four hour period. Heating was continued for 2¾ hours after the metering was completed until greater than 99.5 weight percent of the monomer was converted to polymer. The polynmer slurry viscosity during the course of the polymerization was satisfactory. The slurry total solids was 15.7 weight percent.

695 weight parts of the methylene chloride/polymer slurry was placed in a stripping vessel and the solvent exchange with mineral spirits was begun by stripping off the methylene chloride under reduced pressure ($8.9$–$9.0 \times 10^4$ Pa), over a period of 75 minutes as the temperature was increased from 62° to 97° C. As the methylene chloride was removed from the slurry, it was replaced by mineral spirits (0.788 density) (M.Spirits) added in volume increments, as shown in the following Table I.

TABLE I

| elapsed time minutes | Temp (°C.) | Pressure Pa | cumulative ml CH$_2$Cl$_2$ collected | cumulative ml M. Spirits added |
|---|---|---|---|---|
| 0 | 62 | $9 \times 10^4$ | start | — |
| 4 | 68 | $8.9 \times 10^4$ | 25 | 100 |
| 17 | 83 | $8.9 \times 10^4$ | 150 | 190 |
| 22 | 87 | $8.9 \times 10^4$ | 200 | 250 |
| 29 | 90 | $8.9 \times 10^4$ | 250 | 300 |
| 75 | 97 | $8.9 \times 10^4$ | 300 | 300 |

At this point, the pressure was reduced to about $2.1 \times 10^4$ Pa and the temperature was maintained at 95° C. to 97° C. for about 5½ hours. An additional 110 volume parts of methylene chloride was collected. The viscous but handleable slurry in mineral spirits had a total solids content of 30 weight percent. This slurry is easily pumped and showed no sign of separation in storage.

The polymer slurry was used to make 1.0, 0.5 and 0.2 weight percent active polymer mucilages in water. The pH of the mucilages was adjusted to 7.2 with a sodium hydroxide solution and the viscosity of each was determined by the Brookfield viscometer at 20 rpm. The values obtained were: 1.0%-71,800, 0.5%-49,800, 0.2%-19,000 centipoises.

EXAMPLE II

In this embodiment of the invention, a cross-linked polyacrylic acid was prepared in methylene chloride, with 100 weight parts of acrylic acid, 2.0 weight parts of trimethylol propane diallyl ether and 4 weight parts of sorbitan polyoxyethylene(20)monostearate surfactant, in enough methylene chloride, to provide a polymer total solids content of 15 weight percent, following the procedure of Example I. This 15% slurry was then diluted to 12.4% total solids with methylene chloride containing 3.5 weight parts per 100 weight parts of methylene chloride of Pluronic L122, a condensate of ethylene oxide with a hydrophobic base formed by condensing propylene oxide with propylene glycol (BASF Wyandotte). The slurry was then stripped-exchanged with mineral spirits as shown in Table II:

TABLE II

| elapsed time minutes | Temp (°C.) | Pressure Pa | cumulative ml $CH_2Cl_2$ collected | cumulative ml. M. Spirits added |
|---|---|---|---|---|
| 0  | 58 | 8.8 × 10⁴ | start | — |
| 13 | 68 | 8.7 × 10⁴ | 100 | 50 |
| 16 | 73 | 8.9 × 10⁴ | 150 | 100 |
| 19 | 76 | 8.8 × 10⁴ | 200 | 150 |
| 22 | 79 | 8.8 × 10⁴ | 250 | 200 |
| 24 | 81 | 8.7 × 10⁴ | 300 | 250 |
| 28 | 84 | 8.7 × 10⁴ | 350 | 300 |
| 33 | 88 | 8.7 × 10⁴ | 400 | 302 |
| 38 | 90 | 8.8 × 10⁴ | 440 | 352 |
| 41 | 90 | 8.8 × 10⁴ | 465 | 402 |
| 73 | 94 | 8.9 × 10⁴ | 505 | 402 |

At this point the pressure was decreased to $1.3 \times 10^4$ Pa, and the temperature was maintained at 94°–97° C. for 5 hours and 51 minutes. A 24.3% total solids flowable viscous slurry was obtained. Mucilages of this polymer in mineral spirits slurry were prepared as described in Example I. Viscosities of the resulting mucilages were: 1.0%-98,000, 0.5%-60,800, 0.2%-22,800.

EXAMPLE III

In this Example, a 19.65% total solids slurry of a polyacrylic acid in benzene, cross-linked with about 0.67 weight parts of allyl pentaerythritol per 100 weight parts of acrylic acid, was used to obtain the desired mineral spirits slurry of this polymer by solvent exchange. 490.4 weight parts of the polymer slurry in benzene was mixed with 144.5 weight parts of mineral spirits, 4.3 weight parts of lauryl-stearyl alcohol and 2.15 weight parts of Atmos 300, mono and diglycerides of fat forming fatty acids (ICI Americas Inc.). The benzene was then stripped and replaced with mineral spirits as set forth in the following Table III.

TABLE III

| elapsed time minutes | Temp (°C.) | Pressure Pa | cumulative Vol. benzene collected | cumulative wgt. Mineral Spirits added |
|---|---|---|---|---|
| 0   | 90 | 2.3 × 10⁴ | —   | 144.5 g |
| 1   | 90 | 2.2 × 10⁴ | 50  | 144.5 |
| 2   | 90 | 2.2 × 10⁴ | 100 | 144.5 |
| 4   | 90 | 2.2 × 10⁴ | 150 | 144.5 |
| 6   | 90 | 2.1 × 10⁴ | 200 | 144.5 |
| 13  | 90 | 2.1 × 10⁴ | 250 | 144.5 |
| 18  | 93 | 2.1 × 10⁴ | 300 | 144.5 |
| 38  | 91 | 2.2 × 10⁴ | 350 | 144.5 |
| 88  | 92 | 2.2 × 10⁴ | 400 | 253.4 |
| 197 | 95 | 1.9 × 10⁴ | 425 | 290.9 |
| 392 | 95 | 0.6 × 10⁴ | 450 | 295.1 |

The final slurry total solids was 24.5 weight percent. The mucilage viscosities obtained were: 1.0%-77,200, 0.5%-42,900, and 0.2%-29,100.

EXAMPLE IV

A polymer slurry was prepared following the general procedure of Example I but using only 1.8 weight parts of the trimethylol propane diallyl ether, to obtain a polymer slurry total solids of 13.1%. A solvent interchange was then effected, as described in the Examples above, with mineral oil, specific gravity 0.880–0.895, to provide a useful slurry having an increased polymer total solids of 21%.

In accordance with the process of this invention, cross-linked carboxylic polymers are supplied to the trade in certain petroleum based solvents, mineral oil and mineral spirits, for example, in which form the slurried polymers are directly usable, and are free of the benzene and halogenated hydrocarbons normally used as polymerization media for the carboxylic acids.

In typical commercial applications, cross-linked acrylic acid polymers find many uses in the printing industry, as in textile printing. For use in these industries, the dried, cross-linked polymer normally supplied is often slurried in mineral spirits before being "let down" into water during preparation of a print paste. For such applications, providing the mineral spirits slurry to the end user eliminates the step of slurrying the dry powder by the user. Further, since the polymer concentration in mineral spirits often must be greater than 30 weight percent, and this can be readily provided in accordance with the process of this invention, such dispersions find enhanced application in the carpet industry and in many other applications where mineral spirits slurries are used.

This last factor is also important in the production of the polymer slurries because it is often difficult to prepare high total solids slurries of cross-linked polyacrylic acid directly be polymerization. The process of this invention allows one to polymerize the polymers to lower slurry total solids contents, and with polymerization media that are more desirable for polymerization, but undesirable in end uses, both for reasons of production and polymer quality, and still obtain readily high total solids slurries in solvents desired by or used in the trade by the end user.

I claim:

1. A process for exchanging the solvent, having a boiling point of less than about 125° C., used as the polymerization media in the polymerization of unsaturated carboxylic acid monomers to form a slurry of the carboxylic acid polymer in the polymerization media, with a petroleum based, substantially aliphatic, hydrocarbon liquid having a boiling range of about 140° C. to about 350° C., comprising heating the slurry to distill off the polymerization media in the presence of the petroleum base liquid that is present in the slurry being heated at least before about 50 volume percent of the polymerization media has been removed by distillation, and continuing the distillation until substantially all of the polymerization media has been distilled off and replaced during the distillation with the petroleum base liquid in amounts equal to at least about one-half the volume of the polymerization media originally present in the slurry, the total amount of polymerization media and/or petroleum base liquid present in the slurry during the distillation being sufficient to maintain the polymer slurry during the exchange of the polymerization media and the petroleum base liquid, whereby a slurry of the carboxylic acid polymer in the petroleum base liquid is obtained.

2. A process of claim 1 wherein in said carboxylic acid, the olefinic double bond is in the alpha-beta position with respect to a carboxyl group or is part of a terminal methylene group.

3. A process of claim 2 wherein said carboxylic acid is selected from the group consisting of acrylic acid, metharcylic acid, and maleic acid.

4. A process of claim 3 wherein said carboxylic acid is acrylic acid present in amounts of greater than 40 weight percent and from 0 to 60 weight percent of at least one other vinylidene monomer containing at least one $CH_2{=}CH{<}$ group copolymerized therewith.

5. A process of claim 4 wherein said acrylic acid is present in amounts greater than 70 weight percent and there is present less than 5 weight percent of a polyfunctional cross-linking vinylidene monomer containing at least two terminal $CH_2<$ groups.

6. A process of claim 5 wherein said cross-linking agent is selected from the group consisting of allyl pentaerythritol, allyl sucrose and trimethylolpropane diallylether.

7. A process of claim 1 wherein the petroleum base liquid is mineral spirits.

8. A process of claim 7 wherein the amount of mineral spirits added to the slurry as the polymerization media is being distilled off is an amount to essentially maintain the original volume of the slurry.

9. A process of claims 7 wherein the mineral spirits being added during the distillation of the polymerization media is less than the volume of polymerization media distilled off so that the resulting total solids per volume of the slurry in the mineral spirits is greater than the total solids per volume of the original polymer slurry.

10. A process of claim 7 wherein all of the mineral spirits is added to the slurry before distillation of the polymerization media.

11. A process of claim 6 wherein the petroleum based solvent is mineral spirits.

12. A process of claim 6 wherein the amount of mineral spirits added to the slurry as the polymerization media is being distilled off is an amount to essentially maintain the original volume of the slurry.

13. A process of claim 6 wherein the mineral spirits being added during the distillation of the polymerization media is less than the volume of polymerization media distilled off so that the resulting total solids per volume of the slurry in the mineral spirits is greater than the total solids per volume of the original polymer slurry.

14. A process of claim 6 wherein all of the mineral spirits is added to the slurry before distillation of the polymerization media.

15. A process of claim 1 wherein the petroleum base liquid is mineral oil.

16. A process of claim 9 wherein the volume of mineral spirits added is enough to provide a mineral spirits polymer slurry total solids of greater than 30 weight percent.

* * * * *